US012608259B2

(12) United States Patent
Li et al.

(10) Patent No.: US 12,608,259 B2
(45) Date of Patent: Apr. 21, 2026

(54) METHOD, AND DEVICE FOR DETECTING MEMORY FAULT, MEDIUM AND SERVER

(71) Applicant: SUZHOU METABRAIN INTELLIGENT TECHNOLOGY CO., LTD., Suzhou (CN)

(72) Inventors: Shengxin Li, Suzhou (CN); Daotong Li, Suzhou (CN); Shuaishuai Jia, Suzhou (CN); Yandong Chen, Suzhou (CN); Hongrui Han, Suzhou (CN); Shanbin Ai, Suzhou (CN)

(73) Assignee: SUZHOU METABRAIN INTELLIGENT TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 19/246,508

(22) Filed: Jun. 23, 2025

(65) Prior Publication Data

US 2025/0315330 A1     Oct. 9, 2025

Related U.S. Application Data

(63) Continuation of application No. PCT/CN2024/089601, filed on Apr. 24, 2024.

(30) Foreign Application Priority Data

Oct. 17, 2023     (CN) .......................... 202311338966.1

(51) Int. Cl.
   *G06F 11/00*      (2006.01)
   *G06F 11/07*      (2006.01)
(52) U.S. Cl.
   CPC .......... *G06F 11/076* (2013.01); *G06F 11/073* (2013.01)

(58) Field of Classification Search
   CPC ............................ G06F 11/073; G06F 11/076
   See application file for complete search history.

(56) References Cited

U.S. PATENT DOCUMENTS

| | | | | |
|---|---|---|---|---|
| 2013/0179724 A1* | 7/2013 | Cordero | ................ | G11C 29/76 |
| | | | | 714/E11.089 |
| 2014/0281681 A1* | 9/2014 | Cordero | ................ | G06F 11/073 |
| | | | | 714/6.3 |

(Continued)

FOREIGN PATENT DOCUMENTS

| | | |
|---|---|---|
| CN | 111104238 A | 5/2020 |
| CN | 111522684 A | 8/2020 |

(Continued)

*Primary Examiner* — Joshua P Lottich
(74) *Attorney, Agent, or Firm* — IPro, PLLC

(57)     ABSTRACT

This solution monitors the operating status of the memory, acquires the error information of the memory, and determines the number of times of the correctable error that occurs in the memory based on the error information; when the number of times of the correctable error reaches the preset trigger number of times, calculates the target detection parameter based on the error information, and determines the fault detection result of the memory based on the target detection parameter. It may be seen that the present application only uses the number of times of the correctable errors as a triggering condition. After this triggering condition is triggered, the target detection parameters will be further calculated based on the error information to conduct in-depth analysis and understanding of the relationship between the number of the correctable errors that occur in the memory and the faults.

17 Claims, 4 Drawing Sheets

(56)         References Cited

U.S. PATENT DOCUMENTS

2015/0378801 A1*  12/2015  Navon  ................. G06F 11/076
                                                                714/704
2019/0266037 A1*   8/2019  Shah  ....................... G06F 13/24
2021/0117257 A1*   4/2021  Hoang  ............... G06F 11/0772
2021/0311823 A1*  10/2021  Schat  ................. G06F 11/1068
2024/0362101 A1*  10/2024  Breitenbach  ......... G06N 3/0464
2025/0208937 A1*   6/2025  Jia  ......................... G06F 11/076

FOREIGN PATENT DOCUMENTS

CN          114090316  A    2/2022
CN          115480947  A   12/2022
CN          115629905  A    1/2023
CN          115756911  A    3/2023
CN          115794588  A    3/2023
CN          115981898  A    4/2023
CN          116643943  A    8/2023
CN          117076186  A   11/2023
JP          2022126966  A    8/2022

* cited by examiner

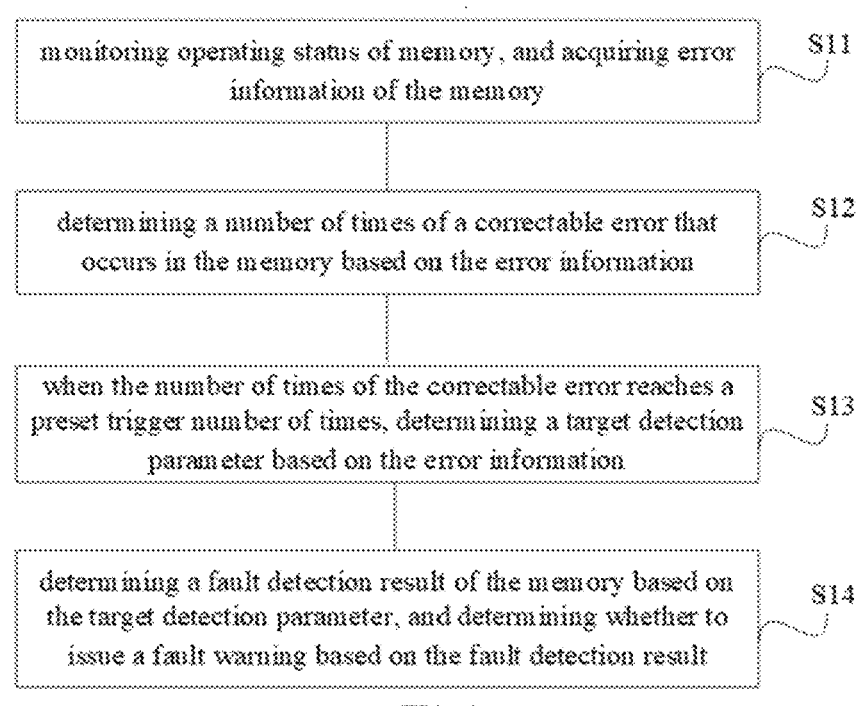

monitoring operating status of memory, and acquiring error information of the memory — S11 determining a number of times of a correctable error that occurs in the memory based on the error information — S12 when the number of times of the correctable error reaches a preset trigger number of times, determining a target detection parameter based on the error information — S13 determining a fault detection result of the memory based on the target detection parameter, and determining whether to issue a fault warning based on the fault detection result — S14

FIG. 1

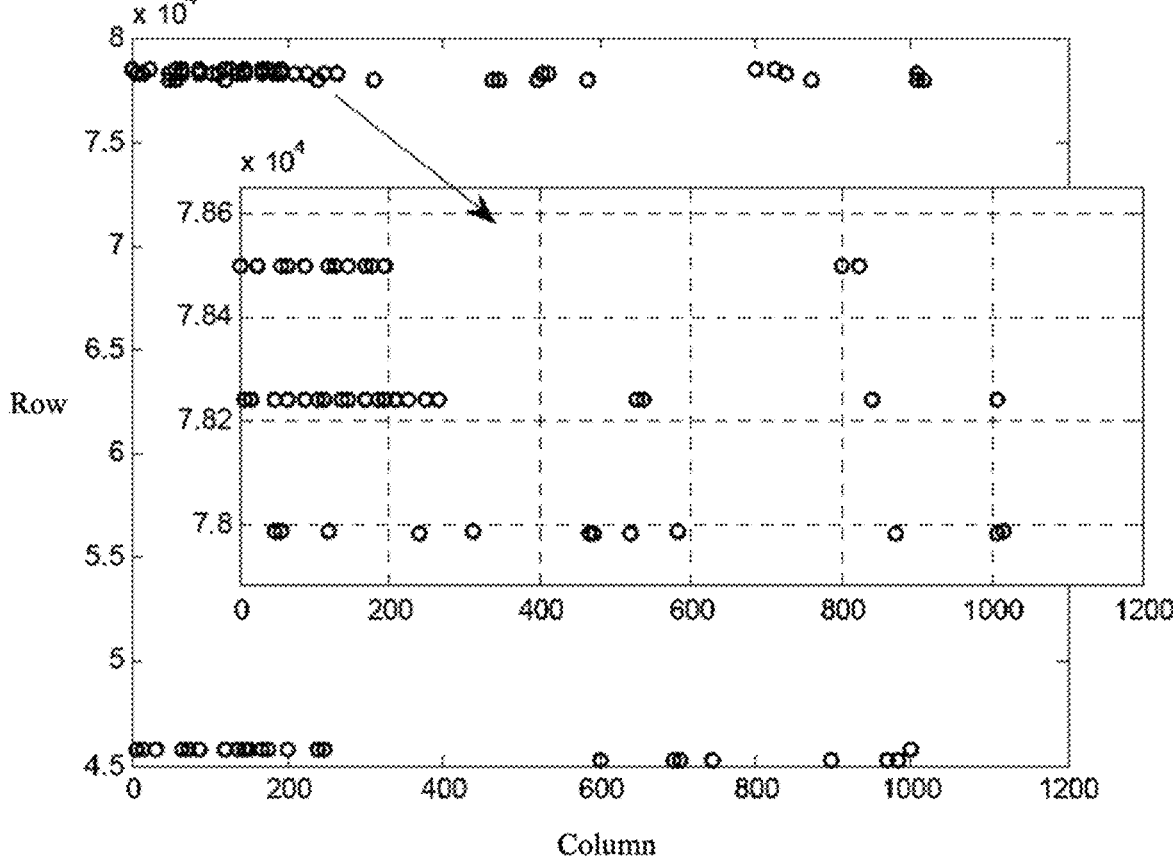

FIG. 2 baseboard management controller integrated management controller central processing unit memory server

METHOD, AND DEVICE FOR DETECTING MEMORY FAULT, MEDIUM AND SERVER

CROSS-REFERENCE TO RELATED APPLICATION

This application claims the priority of the Chinese Patent application filed on Oct. 17, 2023 before the CNIPA, China National Intellectual Property Administration with the application number of 202311338966.1, and the title of "METHOD, SYSTEM, AND DEVICE FOR DETECTING MEMORY FAULT, MEDIUM AND SERVER", which is incorporated herein in its entirety by reference.

FIELD

The present application relates to the field of server security and more particularly, to a method, system, and device for detecting a memory fault, a non-transitory readable storage medium and a server.

BACKGROUND

Server memory fault warning technology is the key to ensuring stable operation of servers, as once a memory fault occurs, it may lead to a decrease in server performance or even crash, causing serious losses to users and enterprises. This technology aims to detect potential fault risks in advance by monitoring and analyzing the operating status of server memory and take timely measures to avoid or mitigate the impact of faults on the servers.

Warning technology mainly covers the monitoring of memory faults, by setting monitoring points to monitor the operating status of memory in real time, including fault conditions, numbers of CE (corrected errors, correctable errors) and UCE (uncorrected errors, uncorrectable errors), and other indicators. At present, the monitoring solution usually only determines whether to issue a fault warning based on the comparison result between the total number of CEs and the threshold. This solution may not fully reflect the situation of the memory faults. For example, when the cumulative number of CEs reaches the threshold over a long period of time, it does not necessarily mean that the memory will fail, so it may not be necessary to issue the fault warning. Therefore, it is necessary to conduct in-depth analysis and understanding of the relationship between the number of CEs in the memory and the faults, so as to improve the reliability and accuracy of fault analysis.

SUMMARY

The present application aims to provide a method, system, and device for detecting a memory fault, a non-transitory readable storage medium and a server, which only use the number of times of the correctable errors as a triggering condition. After this triggering condition is triggered, the target detection parameters will be further calculated based on the error information to conduct in-depth analysis and understanding of the relationship between the number of the correctable errors that occur in memory and the faults, it is not just about considering the total number of the correctable errors, to improve the reliability and accuracy of fault analysis.

To solve the above technical problems, the present application provides a method for detecting a memory fault, including:

monitoring operating status of memory, and acquiring error information of the memory;

determining a number of times of a correctable error that occurs in the memory based on the error information;

when the number of times of the correctable error reaches a preset trigger number of times, determining a target detection parameter based on the error information; and determining a fault detection result of the memory based on the target detection parameter, and determining whether to issue a fault warning based on the fault detection result.

In an embodiment, monitoring the operating status of the memory, and acquiring the error information of the memory includes:

monitoring the operating status of the memory, and determining an error type when an error occurs in the memory, wherein the error type includes a hard error and a soft error.

In an embodiment, when the error occurs in the memory, the method further includes:

determining a memory unit where the error occurs, and acquiring address information of the memory unit where the error occurs.

In an embodiment, determining the target detection parameter based on the error information includes:

determining a hard fault unit based on a number of times of the hard error that occurs and the address information of the memory unit;

wherein determining the fault detection result of the memory based on the target detection parameter, and determining whether to issue the fault warning based on the fault detection result includes:

determining the fault detection result of the memory based on a number of hard fault units, and determining whether to issue the fault warning based on the fault detection result.

In an embodiment, determining the target detection parameter based on the error information includes:

determining a soft fault unit based on a number of times of the soft error that occurs and the address information of the memory unit;

wherein determining the fault detection result of the memory based on the target detection parameter, and determining whether to issue the fault warning based on the fault detection result includes:

determining the fault detection result of the memory based on a number of soft fault units, and determining whether to issue the fault warning based on the fault detection result.

In an embodiment, determining the fault detection result of the memory based on the target detection parameter, and determining whether to issue the fault warning based on the fault detection result includes:

determining the fault detection result of the memory comprehensively based on the number of the hard fault units and the number of the soft fault units, and determining whether to issue the fault warning based on the fault detection result.

In an embodiment, determining the fault detection result of the memory comprehensively based on the number of the hard fault units and the number of the soft fault units, and determining whether to issue the fault warning based on the fault detection result includes:

calculating a first ratio of the number of the hard fault units to a number of total fault units, wherein the number of the total fault units is a sum of the number of the hard fault units and the number of the soft fault units;

determining whether the first ratio reaches a first threshold;

in response to the first ratio reaching the first threshold, determining that the memory is at risk of a fault, and issuing the fault warning.

In an embodiment, a plurality of memory units are arranged in an array structure; and determining the target detection parameter based on the error information includes:

determining a number of memory units with errors in each row based on address information of memory units where the errors occur;

determining a row where the number of the memory units with the errors exceeds a first preset number as a fault row;

wherein determining the fault detection result of the memory based on the target detection parameter, and determining whether to issue the fault warning based on the fault detection result includes:

determining the fault detection result of the memory based on a number of fault rows, and determining whether to issue the fault warning based on the fault detection result.

In an embodiment, determining the fault detection result of the memory based on the number of the fault rows, and determining whether to issue the fault warning based on the fault detection result includes:

determining whether the number of the fault rows reaches a second threshold;

in response to the number of the fault rows reaching the second threshold, determining that the memory is at risk of a fault, and issuing the fault warning.

In an embodiment, a plurality of memory units are arranged in an array structure; and determining the target detection parameter based on the error information includes:

determining a number of memory units with errors in each column based on address information of memory units where the errors occur;

determining a column where the number of the memory units with the errors exceeds a second preset number as a fault column;

wherein determining the fault detection result of the memory based on the target detection parameter, and determining whether to issue the fault warning based on the fault detection result includes:

determining the fault detection result of the memory based on a number of fault columns, and determining whether to issue the fault warning based on the fault detection result.

In an embodiment, determining the fault detection result of the memory based on the number of the fault columns, and determining whether to issue the fault warning based on the fault detection result includes:

determining whether the number of the fault columns reaches a third threshold;

in response to the number of the fault columns reaching the third threshold, determining that the memory is at risk of a fault, and issuing the fault warning.

In an embodiment, an array structure of memory units is divided into a plurality of areas; and determining the target detection parameter based on the error information includes:

determining a number of memory units with errors in each area based on address information of memory units where the errors occur;

determining an area where the number of the memory units with the errors exceeds a third preset number as a fault area;

wherein determining the fault detection result of the memory based on the target detection parameter, and determining whether to issue the fault warning based on the fault detection result includes:

determining the fault detection result of the memory based on a number of fault areas, and determining whether to issue the fault warning based on the fault detection result.

In an embodiment, determining the fault detection result of the memory based on the number of the fault areas, and determining whether to issue the fault warning based on the fault detection result includes:

determining whether the number of the fault areas reaches a fourth threshold;

in response to the number of the fault areas reaching the fourth threshold, determining that the memory is at risk of a fault, and issuing the fault warning.

In an embodiment, after determining to issue the fault warning, the method further includes:

generating a fault log and controlling the memory to restart, power down, or switch to spare memory.

In an embodiment, determining the target detection parameter based on the error information includes:

determining a frequency of a correctable error that occurs based on the error information;

wherein determining the fault detection result of the memory based on the target detection parameter, and determining whether to issue the fault warning based on the fault detection result includes:

determining whether there is a frequency spike point based on the frequency, wherein a frequency change rate of the frequency spike point is greater than a change rate threshold; and when there is the frequency spike point, determining that the memory is at risk of a fault, and issuing the fault warning.

In an embodiment, determining the frequency of the correctable error that occurs based on the error information includes:

acquiring numbers of times of the correctable error that occurs in the memory during a plurality of consecutive first time periods;

wherein determining whether there is the frequency spike point based on the frequency includes:

determining whether a difference value between a number of times of the correctable error that occurs in the memory during a current first time period and a number of times of the correctable error that occurs in the memory during a previous first time period is greater than a number-of-times threshold; and when the difference value between the number of times of the correctable error that occurs in the memory during the current first time period and the number of times of the correctable error that occurs in the memory during the previous first time period is greater than the number-of-times threshold, determining there is the frequency spike point in the current first time period.

In an embodiment, determining the frequency of the correctable error that occurs based on the error information includes:

acquiring a plurality of consecutive second time periods during which numbers of times of the correctable error reach a preset trigger number of times;

wherein determining whether there is the frequency spike point based on the frequency includes:

determining whether a difference value between a current second time period and a previous second time period is greater than a time threshold;

when the difference value between the current second time period and the previous second time period is greater than the time threshold, determining there is a mutation point in the current second time period.

In an embodiment, determining whether there is the frequency spike point based on the frequency includes:

calculating a significance level based on a preset formula, wherein the preset formula is:

$$
\begin{cases}
U_{k,n} = U_{k-1,n} + \sum_{j=1}^{n} \mathrm{sgn}(t_k - t_j) & k = 2, \ldots, n \\
\mathrm{sgn}(t_k - t_j) = \begin{cases} 1 & (t_j - t_k) > 0 \\ 0 & (t_j - t_k) = 0 \\ -1 & (t_j - t_k) < 0 \end{cases} \\
P_k = 2\exp\left( \dfrac{-6\left( \max_{1 \le k \le n} |U_{k,n}| \right)^2}{n^3 + n^2} \right)
\end{cases}
$$

where $t_k$ is a second time period corresponding to the frequency mutation point, $t_j$ is a j-th second time period, n is a number of all acquired second time periods, $\mathrm{sgn}(\bullet)$ is a signum function, $U_{k,n}$ is a statistic corresponding to a k-th second time period, $U_{k-1,n}$ is a statistic corresponding to a $(k-1)$-th second time period, $P_k$ is the significance level, and exp $(\bullet)$ is an exponential function; and when the significance level is not greater than a confidence level, determining there is the frequency mutation point; when the significance level is greater than the confidence level, determining there is no frequency mutation point.

To solve the above technical problems, the present application further provides a system for detecting a memory fault, including:

a monitoring unit, configured for monitoring operating status of memory, and acquiring error information of the memory;

a number-of-times determination unit, configured for determining a number of times of a correctable error that occurs in the memory based on the error information;

a parameter determination unit configured for, when the number of times of the correctable error reaches a preset trigger number of times, determining a target detection parameter based on the error information; and a fault warning unit, configured for determining a fault detection result of the memory based on the target detection parameter, and determining whether to issue a fault warning based on the fault detection result.

To solve the above technical problems, the present application further provides a device for detecting a memory fault, including:

a storage, used for storing a computer program;

a processor used for, when storing the computer program, implementing steps of the method for detecting the memory fault according to any one of the above embodiments.

To solve the above technical problems, the present application further provides a non-transitory computer-readable storage medium, wherein the non-transitory computer-readable storage medium stores a computer program, and the computer program, when executed by a processor, implements steps of the method for detecting the memory fault according to any one of the above embodiments.

To solve the above technical problems, the present application further provides a server, including the device for detecting the memory fault as described above.

The present application provides a method, system, and device for detecting a memory fault, a non-transitory readable storage medium and a server, related to the field of server security, for solving the problem of low reliability in detection and warning of the memory fault. This solution monitors the operating status of the memory, acquires the error information of the memory, and determines the number of times of the correctable error that occurs in the memory based on the error information; when the number of times of the correctable error reaches the preset trigger number of times, calculates the target detection parameter based on the error information, and determines the fault detection result of the memory based on the target detection parameter. It may be seen that the present application only uses the number of times of the correctable errors as a triggering condition. After this triggering condition is triggered, the target detection parameters will be further calculated based on the error information to conduct in-depth analysis and understanding of the relationship between the number of the correctable errors that occur in the memory and the faults, rather than just considering the total number of the correctable errors, in order to improve the reliability and accuracy of fault analysis.

BRIEF DESCRIPTION OF THE DRAWINGS

In order to more clearly illustrate the technical solution of the embodiments of the present application, a brief introduction will be given to the accompanying drawings required to be used in the prior art and the embodiments. It is obvious that the accompanying drawings described below are only some embodiments of the present application. For those skilled in the art, other drawings may be obtained based on these drawings without creative work.

FIG. 1 is a flowchart of a method for detecting a memory fault according to the present application;

FIG. 2 is a schematic diagram of a fault row according to the present application;

DETAILED DESCRIPTION

Figure 3:
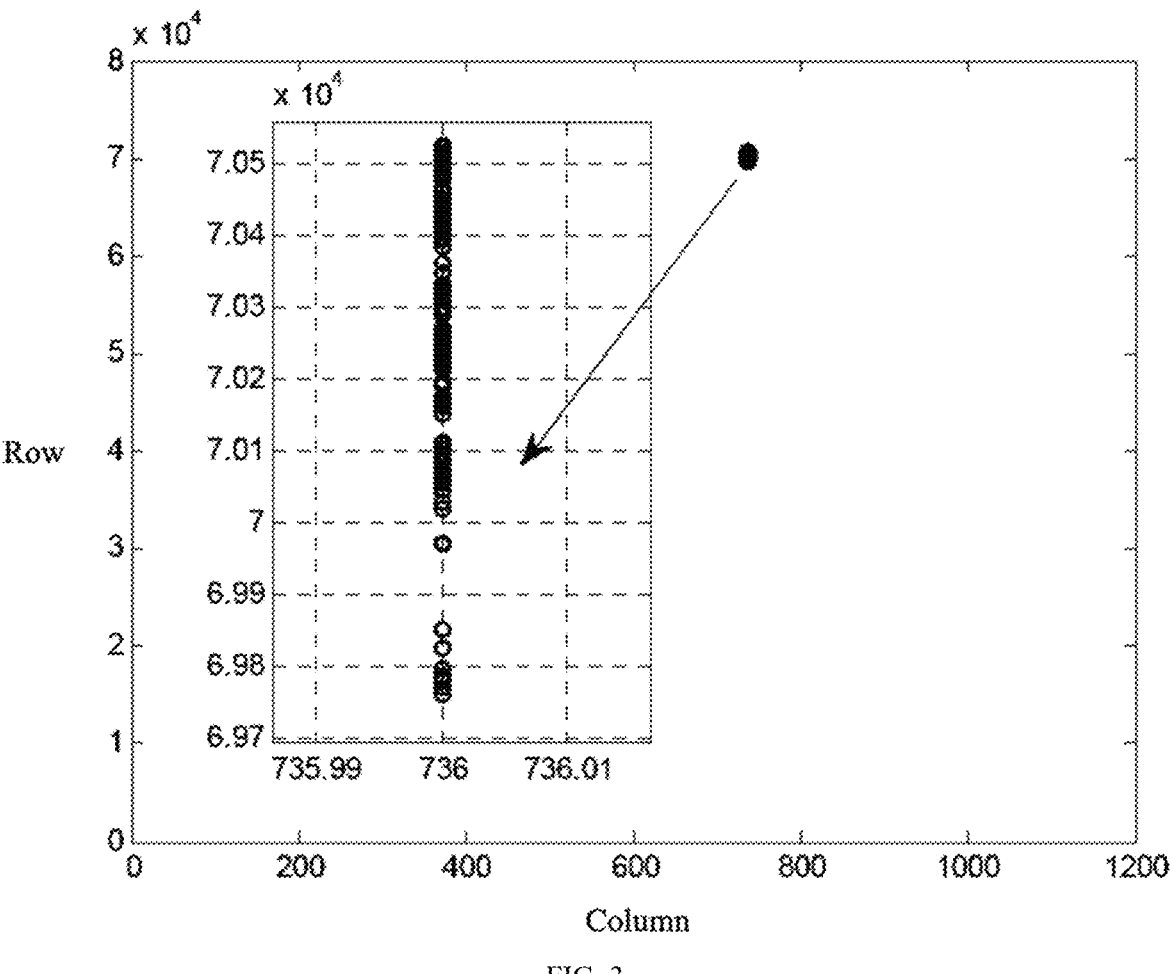
FIG. 3 is a schematic diagram of a fault column according to the present application.

The core of the present application is to provide a method, system, and device for detecting a memory fault, a non-transitory readable storage medium and a server, which only uses the number of times of the correctable errors as a triggering condition. After this triggering condition is triggered, the target detection parameters will be further calculated based on the error information to conduct in-depth analysis and understanding of the relationship between the number of the correctable errors that occur in the memory and the faults, rather than just considering the total number of the correctable errors, in order to improve the reliability and accuracy of fault analysis.

In order to clarify the purpose, technical solution, and advantages of the embodiments of the present application, the following will provide a clear and complete description of the technical solution in the embodiments of the present application in conjunction with the accompanying drawings. Obviously, the described embodiments are a part of the embodiments of the present application, not all of them. Based on the embodiments in the present application, all other embodiments obtained by persons skilled in the art without creative work are within the scope of protection of the present application.

The method for detecting a memory fault in the present application may be applied to a Baseboard Management Controller (BMC) of the server, but is not limited to this. The BMC acquires error information of the memory by an Integrated Management Controller (IMC) of a central processing unit, performs fault detection based on the acquired error information, and to determine whether to issue a fault warning.

To solve the above technical problems, the present application provides a method for detecting a memory fault, as shown in FIG. 1, including:

S11: monitoring operating status of memory, and acquiring error information of the memory.

This step is to monitor the operating status of the memory and acquire the error information of the memory. The method for detecting the memory fault monitors the operating status of the memory in real time by setting monitoring points, these monitoring points may collect the error information of the memory. By monitoring the error information, the status of memory and possible fault conditions may be comprehensively understood, providing necessary data support for subsequent fault analysis. The purpose of this step is to obtain the error information of the memory for subsequent fault warning analysis and detection result determination.

In some embodiments, when an error occurs in a storage unit of the memory, the relevant time and the physical address of the storage unit where the error occurred will be recorded in the System Event Log (SEL). The BMC reads the SEL logs by the IMC, monitors the operating status of the memory, and obtains the error information of the memory. The operating status of the memory includes the error information of multiple storage units (Cells) of the memory during the time period when the multiple storage units are monitored, such as at which time period and which storage unit (Cell) the error occurred. The acquired error information includes the physical address of each storage unit (Cell) where the error occurred and the time when the error occurred.

S12: determining a number of times of a correctable error that occurs in the memory based on the error information.

In this step, the number of times of the correctable error that occurs in the memory is determined based on the error information. During a monitoring process, when it is detected that an error occurs in the memory, the system records the error information and analyze based on this information. The system identifies and calculates the number of times of the correctable errors. The correctable errors refer to a type of errors that occurs in the memory and may be automatically corrected by the system without significantly affecting the normal operation of the system.

By analyzing the error information, the system may accurately determine the number of times of the correctable error that occurs in the memory. Compared to only considering the total number, the method in the present application may more accurately reflect the fault status of the memory by meticulously calculating and recording the number of times of each error that occurs. This may improve the accuracy of fault analysis and avoid the defect of determining whether to warn based solely on the total number of errors. After completing this step, the target detection parameters will be further calculated based on the error information to analyze and understand the relationship between the number of the correctable errors and the memory faults in more depth, thereby improving the reliability of fault detection and warning.

In some embodiments, determining a number of times of a correctable error that occurs in the memory based on the error information is to determine which errors occurred in the storage unit (Cell) belong to errors that can be corrected using error correction codes (ECC), and the BMC calculates the number of times of occurrences of such errors.

S13: when the number of times of the correctable error reaches a preset trigger number of times, determining a target detection parameter based on the error information.

When the cumulative number of times of the correctable errors reaches the preset trigger number of times, that is, the preset threshold, the system will further perform fault detection to analyze and understand the relationship between the number of the correctable errors and the memory faults. At this point, the error information will be used to calculate the target detection parameters, thereby improving the reliability and accuracy of the fault analysis.

That is to say, during the monitoring process, when the number of times of the correctable errors reaches the preset triggering condition, the system will analyze based on the error information and calculate the target detection parameters. The target detection parameters are used to analyze and understand the relationship between the memory faults and the number of times of the correctable errors in more depth. Based on the error information, the system conducts a more detailed analysis of the operation status of the memory, identifies potential fault factors, and calculates the target detection parameters. The target detection parameters are obtained through further analysis of the error information, which may include the error types, the frequency of occurrences of the errors, the pattern of the occurrences of the errors, etc. The target detection parameters may include various indicators, such as the total number of CEs in the memory, the total number of UCEs, failure rates, etc. These indicators may help the system further analyze and determine whether there are serious memory faults, in order to determine whether timely fault detection and warning are needed.

By using the number of times of the correctable errors as the triggering condition and making it an important step in the process of detecting the memory faults, in this step, the error information is further analyzed, which may more accurately analyze and determine the fault conditions of the memory, and improve the reliability and accuracy of the fault analysis.

In some embodiments, the BMC determines the target detection parameter based on the error information, that is, based on the addresses of multiple storage units (cells) where the errors occur and the time of occurrence of the errors, the BMC determines the error types, the frequency of occurrences of the errors, the pattern of the occurrences of the errors, etc. The error types include soft errors (CE, correctable errors), hard errors (UCE, uncorrectable errors), etc. The pattern of the occurrences of the errors is, for example, determining a row or area of the memory where the errors occur based on the address of the cell where the error occurred. For example, when it is determined that a number of cells at a certain row of the memory where the error occurred is greater than the corresponding threshold based on the address of the cells where the error occurred, it can be determined that this row has an error. When it is determined that a number of cells at a certain area of the memory where the error occurred is greater than the corresponding threshold based on the address of the cells where the error occurred, it can be determined that this area has an error.

S14: determining a fault detection result of the memory based on the target detection parameter, and determining whether to issue a fault warning based on the fault detection result.

In the above process, the target detection parameters are calculated based on the error information, and in this step, these parameters are used to further analyze and determine whether there is a memory fault. Based on the target detection parameters, the system evaluates the fault conditions of the memory. These parameters may include the error types, the frequency of occurrences of the errors, the pattern of the occurrences of the errors, the failure rates, and so on. The system may determine whether the memory is in a fault state by comparing it with a preset threshold or reference value.

Based on the analysis of target detection parameters, the system obtains the fault detection results of the memory. If the result shows that the memory has a fault or is at risk of a fault, the system triggers the fault warning, that is, sending an alert or notify relevant personnel to handle it. On the contrary, if the result shows that the memory has not malfunctioned, the system does not issue the fault warning because no additional repair or replacement operations are required at this time.

In some embodiments, the target detection parameters include the error types, the frequency of the errors, the BMC determines the fault detection result of the memory based on the target detection parameter, that is, based on the error types and the frequency of errors, combined with the address of the cells, the BMC determines the fault detection results, which include row faults, area faults, etc. The BMC determines whether to issue a fault warning based on the fault detection results. If a warning is required, it will be displayed in the UI interface.

In summary, this embodiment may improve the reliability and accuracy of the memory fault analysis, and may comprehensively consider more indicators and factors, not just limited to the total number of the correctable errors, so as to more comprehensively determine the health status of the memory and take appropriate preventive or maintenance measures.

Figures 8, 9:
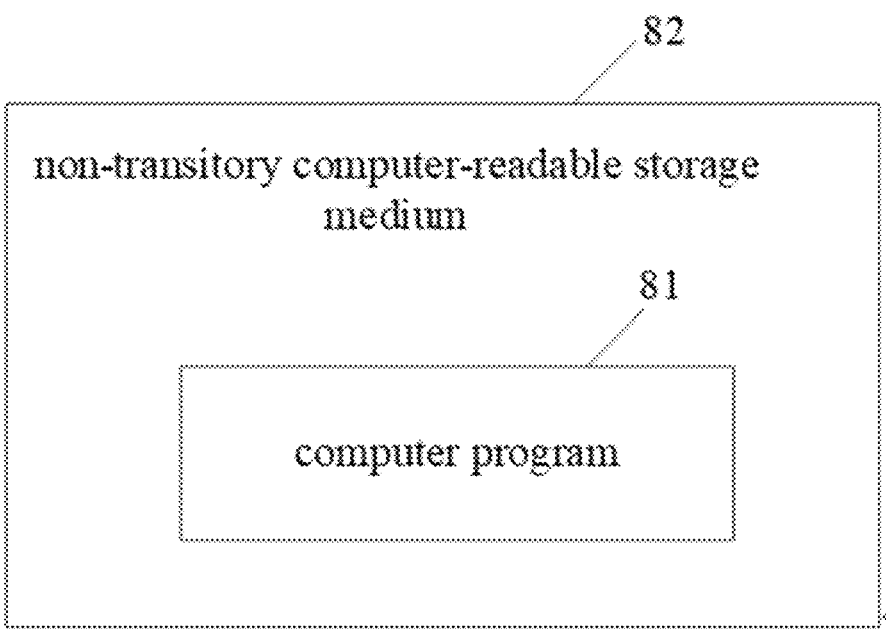
FIG. 8 is a schematic diagram of a non-transitory computer-readable storage medium according to the present application.
FIG. 9 is a structural block diagram of a server according to the present application.

As shown in FIG. 9, it should be noted that the method for detecting the memory fault in the present application may be applied, but is not limited to, to the baseboard management controller (BMC) in the server. BMC obtains the error information of the memory through the integrated management controller (IMC) in the central processing unit, and performs fault detection based on the obtained error information to determine whether to issue the fault warning.

In an embodiment, monitoring the operating status of the memory, and acquiring the error information of the memory includes:

monitoring the operating status of the memory, and determining an error type when an error occurs in the memory, wherein the error type includes a hard error and a soft error.

In this embodiment, in the method for detecting the memory fault, when monitoring the operating status of the memory, it is also necessary to determine the error type, including the hard error and the soft error. This is the specific implementation of the step S11. When monitoring the operating status of memory, the system obtains the error information of the memory in real time. When there is an error in the memory, the system determines the error type based on the error information, that is, the hard error or the soft error. The hard error refers to physical damage on memory chips or circuit boards, such as chip burnout or connection wire detachment. In contrast, the soft error is usually caused by electronic signal interference or operational errors, such as bit flip or voltage noise.

Among them, determining the error type is crucial for subsequent fault analysis and handling. For example, if the hard error occurs, it may be necessary to replace the memory chip or the circuit board to solve the problem. If the soft error occurs, it may be necessary to adjust parameters such as the memory voltage or timing sequence.

By monitoring the operating status of the memory and obtaining the error information, the system may accurately determine whether there is the hard error or the soft error in the memory, and take corresponding measures according to the error type to improve the reliability and stability of the memory.

In an embodiment, when the error occurs in the memory, the method further includes:

determining a memory unit where the error occurs, and acquiring address information of the memory unit where the error occurs.

In this embodiment, when monitoring the operating status of the memory, and when the error occurs in the memory, in addition to determining the error type, it may also determine which specific memory unit has the error and obtain the address information of that memory unit. When implementing this method, the operating status of the memory may be obtained through regular or real-time monitoring of the memory. When it is detected that an error occurs, it may be further determined which memory unit has the error. The memory unit where the error occurs may be determined by recording the memory address information at the time when the error occurs, and the address information of the memory unit may be obtained. This may accurately locate the specific memory unit that caused the error, which is helpful for subsequent error correction or fault warning processing of the memory unit.

The function of determining and obtaining the address information of the memory unit may be used to improve the accuracy and effectiveness of the memory fault detection, facilitate timely handling of the memory errors, and avoid fault propagation and affecting the normal operation of the system.

In an embodiment, determining the target detection parameter based on the error information includes:

determining a hard fault unit based on a number of times of the hard error that occurs and the address information of the memory unit;

wherein determining the fault detection result of the memory based on the target detection parameter, and determining whether to issue the fault warning based on the fault detection result includes:

determining the fault detection result of the memory based on a number of hard fault units, and determining whether to issue the fault warning based on the fault detection result.

In an embodiment, the target detection parameters are determined based on the error information, the fault detection result of the memory is determined based on the target detection parameters, and it is further determined whether to issue the fault warning. In specific implementation, once an error occurs, the system determines the hard fault unit based on the number of times of the hard errors and the address information of the memory unit. By counting the number of times of the occurred hard errors and recording the address information of the memory units where the errors occur, it may determine which memory units have the hard faults. Based on the target detection parameters, the system may further analyze the fault condition of the memory and determine the fault detection results of the memory according to the set rules. For example, if the number of the hard fault units exceeds the preset threshold, the system may determine that the entire memory has the fault. Based on the fault detection results, the system may decide whether to issue the fault warning. If the system determines that the memory has the fault, the warning mechanism may trigger corresponding operations, such as sending an alert to notify the administrator or taking emergency repair measures to avoid the fault causing more serious impact on other systems.

This embodiment implements the process of determining the target detection parameters based on error information, determining the fault detection results of the memory, and issuing the fault warning. Through this process, the system may monitor the status of memory in real time and respond quickly when a fault occurs, ensuring the reliability and stability of the system.

In an embodiment, determining the target detection parameter based on the error information includes:

determining a soft fault unit based on a number of times of the soft error that occurs and the address information of the memory unit;

wherein determining the fault detection result of the memory based on the target detection parameter, and determining whether to issue the fault warning based on the fault detection result includes:

determining the fault detection result of the memory based on a number of soft fault units, and determining whether to issue the fault warning based on the fault detection result.

This embodiment describes a process of determining the target detection parameters based on the error information in the method for detecting the memory fault, including determining the soft fault units and determining the number of the soft fault units.

In an embodiment, when the soft error occurs in the memory, the system counts the number of times of the soft error that occurs and records the address information of the memory units where the errors occur. By counting the number of times of the soft error that occurs and recording the address information of the memory units where the errors occur, it may determine which memory units have the soft faults. Based on the number of times of the soft errors and the address information of the memory unit, the system may determine the soft fault unit. The soft fault unit refers to a memory unit that experiences a soft error during operation.

Based on the target detection parameters, the system may further analyze the fault condition of the memory and determine the fault detection results of the memory according to the set rules. For example, if the number of the soft fault units exceeds the preset threshold, the system may determine that the entire memory has the fault.

Based on the fault detection results, the system may decide whether to issue the fault warning. If the system determines that the memory has the fault, the warning mechanism may trigger corresponding operations to promptly notify the administrator or take repair measures to avoid the faults causing more serious impact on other systems.

This embodiment implements the process of determining the target detection parameters based on the error information, determining the fault detection results of the memory, and issuing the fault warning, especially for handling the soft error situations. Through this process, the system may detect and respond to the soft faults in the memory in a timely manner, improving the reliability and stability of the system.

In an embodiment, determining the fault detection result of the memory based on the target detection parameter, and determining whether to issue the fault warning based on the fault detection result includes:

determining the fault detection result of the memory comprehensively based on the number of the hard fault units and the number of the soft fault units, and determining whether to issue the fault warning based on the fault detection result.

In this embodiment, a method is proposed to determine the fault detection results of the memory based on the target detection parameters, and to determine whether to issue the fault warning based on the fault detection results.

Firstly, this method comprehensively determines the fault detection results of the memory based on the number of the hard fault units and the number of the soft fault units. The hard fault unit refers to a unit in the memory where a hard error occurs, while the soft fault unit refers to a unit in the memory where a soft error occurs. By counting the numbers of the hard fault units and the soft fault units, the fault conditions of the memory may be evaluated.

The fault detection results of the memory may be determined comprehensively based on the number of the hard fault units and the number of the soft fault units, and different levels of fault severity may be set according to the different numbers of the fault units. For example, when the numbers of the hard fault units and the soft fault units are both 0, it may be determined that the memory is working normally; when the numbers of the hard fault units and the soft fault units exceed a certain threshold, it may be determined that the memory has the fault.

It determines whether to issue the fault warning based on the fault detection results, and different warning levels or measures may be set according to the different levels of the fault severity. For example, when the memory has the hard fault, stricter warning measures need to be taken, such as immediately notifying the system administrator to handle the fault or replace the memory; when there is only the soft fault in the memory, warning processing may be delayed or other relatively light repair measures may be taken.

This embodiment may comprehensively consider both the hard faults and the soft faults, thereby more accurately evaluating the fault conditions of the memory, and setting corresponding warning levels or measures based on the fault degree, improving the detection and warning effect of the memory faults, and reducing the impact on the operation of the system.

In an embodiment, determining the fault detection result of the memory comprehensively based on the number of the hard fault units and the number of the soft fault units, and determining whether to issue the fault warning based on the fault detection result includes:

calculating a first ratio of the number of the hard fault units to a number of total fault units, wherein the number of the total fault units is a sum of the number of the hard fault units and the number of the soft fault units;

determining whether the first ratio reaches a first threshold;

in response to the first ratio reaching the first threshold, determining that the memory is at risk of a fault, and issuing the fault warning.

According to a large amount of CE and UCE data analysis, UCE is usually dominated by the hard errors, and before a memory fault occurs, the hard errors are usually more common than the soft errors. According to statistics, in all CEs before the occurrence of UCE, the proportion of the hard errors is about 60%, and the proportion of the hard fault units among all fault units is less than 10%. However, in the period before the occurrence of UCE in the memory, the proportions of the hard faults and the hard error units significantly increase. Therefore, the ratio of the soft fault units and the ratio of the hard fault units are important information for alerting memory faults.

Therefore, this embodiment provides an implementation solution for the method for detecting the memory fault. This method first monitors the operating status of the memory and obtains the error information to determine the number of the hard fault units and the number of the soft fault units. Then, the first ratio of the number of the hard fault units to the number of the total fault units is calculated. The number of the total fault units is the sum of the number of the hard fault units and the number of the soft fault units. Next, it determines whether the first ratio reaches the first threshold. If the first ratio reaches the first threshold, it is determined that the memory is at risk of a fault and the fault warning is issued.

The purpose of this solution is to provide a comprehensive fault detection result of the memory by comprehensively evaluating the fault units of the memory, and to issue the warnings based on the fault detection results. By calculating the ratio of the number of the hard fault units to that of the total fault units, the overall fault situation of the memory may be obtained. If the first ratio reaches the first threshold, it indicates that the proportion of the hard faults is greater than the preset threshold, that is, the memory is at risk of a fault, and the fault warning is needed.

The advantage of this embodiment is that it comprehensively considers both the hard faults and the soft faults, and improves the accuracy and comprehensiveness of memory fault detection by calculating the ratio for determination. At the same time, the fault warning based on the fault detection results is performed, and the measures may be taken timely to avoid serious impact of the memory faults on the system.

As shown in FIG. 2, in an embodiment, a plurality of memory units are arranged in an array structure; and determining the target detection parameter based on the error information includes:

determining a number of memory units with errors in each row based on address information of memory units where the errors occur;

determining a row where the number of the memory units with the errors exceeds a first preset number as a fault row;

wherein determining the fault detection result of the memory based on the target detection parameter, and determining whether to issue the fault warning based on the fault detection result includes:

determining the fault detection result of the memory based on a number of fault rows, and determining whether to issue the fault warning based on the fault detection result.

In this embodiment, the plurality of memory units are arranged in the array structure. The method of this embodiment includes the following steps: first, determining the target detection parameters based on the error information. Among them, the number of memory units with the errors in each row is determined based on the address information of the memory units where the errors occur. Next, the row where the number of the memory units with errors exceeds the first preset number is determined as the fault row. This means that when the number of the memory units with the errors in a certain row exceeds the preset threshold, the row is determined as the fault row. Then, determining the fault detection results of the memory based on the target detection parameters. This means that based on the number of the fault rows, the fault condition of the memory may be determined. For example, when the number of the fault rows exceeds a certain number, it may be determined that the entire memory has the fault. Finally, determining whether to issue the fault warning based on the fault detection results. If it is determined that the memory has the fault, corresponding warning measures may be taken, such as sending alarm messages or notifying maintenance personnel to repair it.

The method in this implementation may effectively detect the memory faults, and by setting appropriate target detection parameters and fault warning strategies, it may detect the memory faults in advance and take measures to repair them, thereby improving the reliability and stability of the system.

In an embodiment, determining the fault detection result of the memory based on the number of the fault rows, and determining whether to issue the fault warning based on the fault detection result includes:

determining whether the number of the fault rows reaches a second threshold;

in response to the number of the fault rows reaching the second threshold, determining that the memory is at risk of a fault, and issuing the fault warning.

This embodiment provides a detailed description and explanation of one situation of the embodiments mentioned above. In this embodiment, a method is proposed to determine the fault detection result of the memory based on the number of the fault rows, and to determine whether to issue the fault warning based on the fault detection result. Firstly, it is necessary to determine whether the number of the fault rows reaches the second threshold. This second threshold may be a pre-set threshold used to determine whether the memory is at risk of a fault.

If the number of the fault rows reaches the second threshold, it may be determined that the memory is at risk of a fault. In this case, it is necessary to issue the fault warning by sending alerts or notifications to relevant personnel or systems for further processing and repair. The fault warning may be achieved through various means, such as sending emails, text messages, or triggering the system alarms.

This embodiment may detect the memory faults in advance and take timely measures to deal with them, thereby avoiding their further spread and impact. In addition, by setting a threshold to determine the risk of faults, it may be flexibly adjusted according to the actual situation, so that the fault detection system may adapt to changes in different situations. In summary, this embodiment describes a method for fault detection and warning based on the number of the fault rows, which may effectively improve the efficiency of memory fault detection and repair, and enhance the stability and reliability of the system.

As shown in FIG. 3, in an embodiment, a plurality of memory units are arranged in an array structure; and determining the target detection parameter based on the error information includes:

determining a number of memory units with errors in each column based on address information of memory units where the errors occur;

determining a column where the number of the memory units with the errors exceeds a second preset number as a fault column;

wherein determining the fault detection result of the memory based on the target detection parameter, and determining whether to issue the fault warning based on the fault detection result includes:

determining the fault detection result of the memory based on a number of fault columns, and determining whether to issue the fault warning based on the fault detection result.

This embodiment describes the specific operational steps in one embodiment. Firstly, in this embodiment, there are multiple memory units arranged in the array structure. Then, the target detection parameters are determined based on the error information.

Based on the address information of the memory units where the errors occur, the number of the memory units with errors in each column may be determined. This means that in the array structure, the fault conditions of the memory may be determined by determining the number of the errors in each column. Furthermore, the column where the number of the memory units with the errors exceeds the second preset number is determined as the fault column. This second preset number may be set according to specific needs to determine the fault condition of the memory column. Finally, this embodiment determines the fault detection results of the memory based on the target detection parameters, and determines whether to issue the fault warning based on the fault detection results. For example, the number of the fault columns may be used to determine the fault detection results of the memory, and whether to issue the fault warning may be determined based on whether the number of the fault columns reaches the third threshold.

In summary, this embodiment provides the method for detecting the memory fault based on the array structure, which determines the fault condition of the memory by determining the number of the memory units with errors and the number of the fault columns, and provides the fault warnings based on specific situations.

In an embodiment, determining the fault detection result of the memory based on the number of the fault columns, and determining whether to issue the fault warning based on the fault detection result includes:

determining whether the number of the fault columns reaches a third threshold;

in response to the number of the fault columns reaching the third threshold, determining that the memory is at risk of a fault, and issuing the fault warning.

In this implementation, the fault detection result of the memory is determined based on the number of the fault columns (i.e. the column where the memory unit with the errors is located), and whether to issue the fault warning is determined based on the fault detection result. The specific steps are: performing statistics and counting based on the number of determined fault columns. If the number of the fault columns reaches the pre-set third threshold, that is, meets a specific condition, subsequent determinations will be conducted. If the number of the fault columns reaches the third threshold, that is, there are a large number of the fault columns in the memory, it means that the memory is at a high risk of the faults. If it is determined that the memory is at risk of the faults, a series of measures may be taken, such as issuing alerts, sending notifications, etc., to remind relevant personnel, so that necessary measures may be taken in a timely manner to prevent or repair the memory faults.

In summary, this embodiment describes using the number of the fault columns to determine the fault detection results of the memory, and determining whether the memory is at risk of the faults based on whether the fault detection results meet the third threshold, and issuing corresponding fault warnings. This technical solution may help improve the accuracy and precision of the memory fault detection, as well as timely detecting and handling the memory faults, thereby enhancing the reliability and stability of the system.

Figures 4, 5, 6, 7:
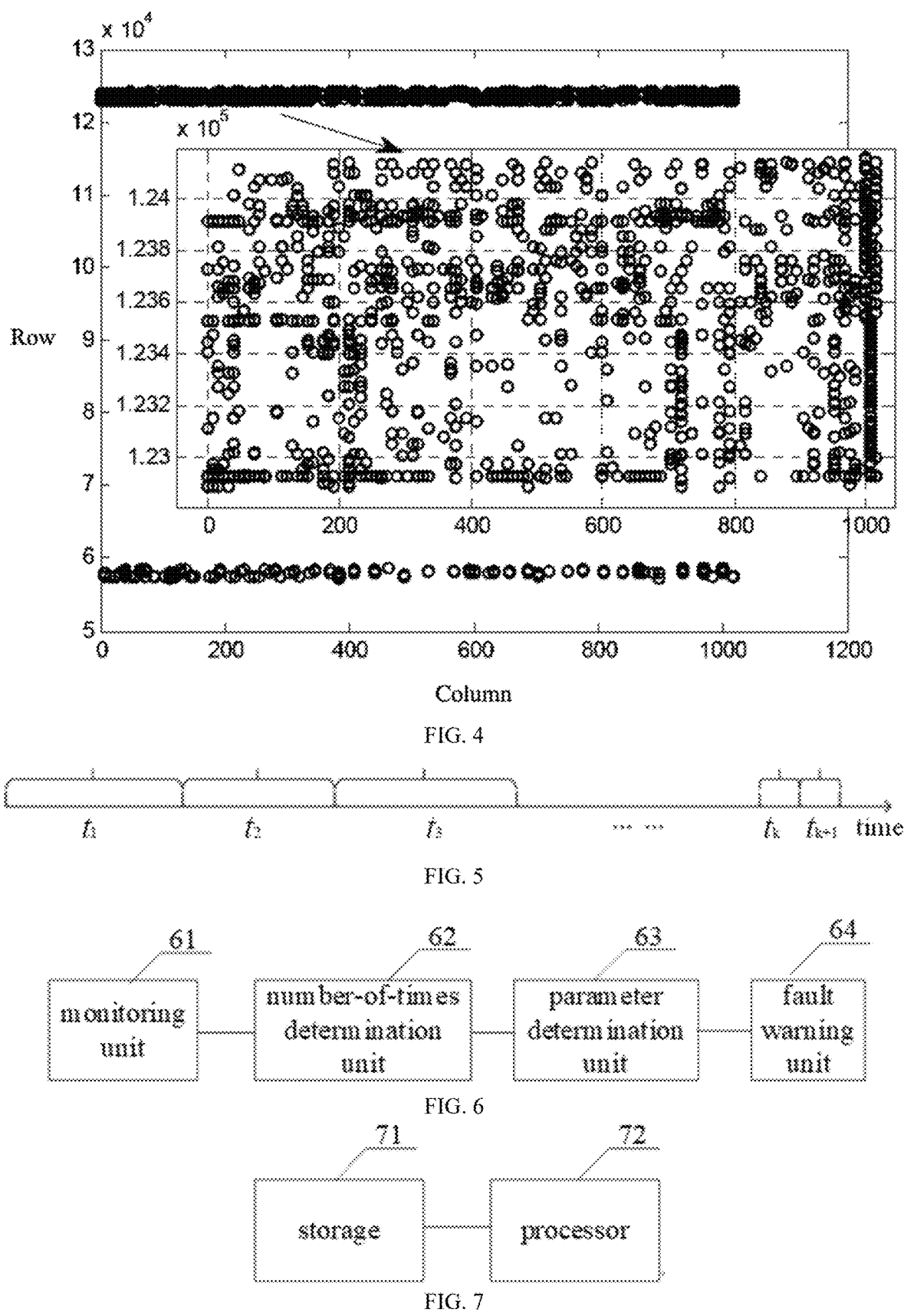
FIG. 4 is a schematic diagram of a fault area according to the present application.
FIG. 5 is a schematic diagram of a method for calculating the time when reaching a preset triggering number of times each time according to the present application.
FIG. 6 is a schematic diagram of a system for detecting a memory fault according to the present application.
FIG. 7 is a schematic diagram of a device for detecting a memory fault according to the present application.

As shown in FIG. 4, in an embodiment, an array structure of memory units is divided into a plurality of areas; and determining the target detection parameter based on the error information includes:

determining a number of memory units with errors in each area based on address information of memory units where the errors occur;

determining an area where the number of the memory units with the errors exceeds a third preset number as a fault area;

wherein determining the fault detection result of the memory based on the target detection parameter, and determining whether to issue the fault warning based on the fault detection result includes:

determining the fault detection result of the memory based on a number of fault areas, and determining whether to issue the fault warning based on the fault detection result.

In this embodiment, the memory units are divided into the plurality of areas, each area includes multiple memory units. Based on the address information of the memory units where the errors occur, the number of the memory units with the errors in each area may be determined. The area where the number of the memory units with the errors exceeds the third preset number is determined as the fault area (by obtaining the address information of the memory units where the errors occur, the number of the memory units with the errors in each area may be calculated. This may help determine the fault area of the memory. If the number of the memory units with the errors exceeds the third preset number, that is, reaches the threshold of the fault areas, then this area is determined as the fault area). The fault detection result of the memory is determined based on the number of the fault areas. Whether to issue the fault warning is determined based on the fault detection results. That is to say, the fault detection result of the memory may be determined based on the number of the fault areas. For example, if the number of the fault areas reaches the fourth threshold, it may be determined that the memory is at risk of the faults and the fault warning may be issued.

In summary, this embodiment provides a specific implementation method for detecting and warning the memory faults by dividing the memory units and determining the fault areas. This method may effectively monitor and identify the fault areas of the memory, and take corresponding fault handling measures in a timely manner.

In an embodiment, determining the fault detection result of the memory based on the number of the fault areas, and determining whether to issue the fault warning based on the fault detection result includes:

determining whether the number of the fault areas reaches a fourth threshold;

in response to the number of the fault areas reaching the fourth threshold, determining that the memory is at risk of a fault, and issuing the fault warning.

In this embodiment, first, the number of the memory units with the errors in each area is determined based on the error information. Then, the system determines whether the number of the fault areas reaches the preset fourth threshold. If the number of the fault areas reaches the fourth threshold, it is determined that the memory is at risk of the fault and the fault warning is issued. If it is found that the number of the fault areas reaches the preset fourth threshold, the system determines that the entire memory is at risk of the faults. In this case, the system triggers a fault warning mechanism to promptly notify the administrator or take other repair measures to avoid the fault causing more serious impact on other systems.

Through the above steps, this method for detecting the memory fault may accurately detect the faults in the memory and respond promptly. When the number of the fault areas reaches the preset fourth threshold, the system determines that the memory is at risk of the faults and initiate the fault warning, thereby helping the administrator take timely measures to ensure the reliability and stability of the system.

In an embodiment, after determining to issue the fault warning, the method further includes:

generating a fault log and controlling the memory to restart, power down, or switch to spare memory.

This embodiment describes further actions after the fault warning. This embodiment includes the following steps: once the fault detection result of the memory triggers the fault warning, the system generates the fault log. The fault log may include detailed information about the fault, such as the fault type, the time of occurrence, etc. By generating the fault logs, the system may record the occurrence and related information of the memory faults, which facilitates subsequent analysis and processing. For memory that has the faults, the system may perform corresponding control operations based on the specific situation. These operations include restarting the memory, turning off the memory power, or switching the system to the spare memory. Through these control operations, the system may restore the normal operation of the memory as much as possible and ensure the stability and reliability of the system.

This embodiment further improves the method for detecting the memory fault by introducing fault log generation and memory control. The generation of the fault logs may provide important basis for fault analysis and handling, while the control operations of the memory may help the system quickly respond to the memory faults and take corresponding measures to ensure the normal operation of the system. These measures may improve the efficiency of system maintenance and fault handling, simultaneously, it may minimize the negative impact of the memory faults on the system operation to the greatest extent possible.

In an embodiment, determining the target detection parameter based on the error information includes:

determining a frequency of a correctable error that occurs based on the error information;

wherein determining the fault detection result of the memory based on the target detection parameter, and determining whether to issue the fault warning based on the fault detection result includes:

determining whether there is a frequency spike point based on the frequency, wherein a frequency change rate of the frequency spike point is greater than a change rate threshold; and when there is the frequency spike point, determining that the memory is at risk of a fault, and issuing the fault warning.

Considering that in most servers in modern data centers, correctable memory errors typically occur in large numbers in a short period of time before the memory fault occurs. Therefore, the alarm function for the memory faults may be achieved by detecting changes in the number of memory CEs within a unit time window period, that is, setting a time period and regularly counting the number of CEs, for example, counting the number of CEs every hour or half an hour to determine if there is a mutation. However, in practical applications, the periodic execution of memory fault prediction alarms has a significant impact on the accuracy of the results due to the setting of the time window size. If the time window is set too large, the frequency for predicting the faults is lower, and the memory fault warnings becomes inaccurate; if the time window is set too small, it cannot effectively serve as an early warning. Memory CE usually occurs in large numbers within a short period of time before the memory fault occurs, that is, the error frequency suddenly increases.

Therefore, this embodiment provides a specific implementation of the method for detecting the memory fault, which includes the following steps: (1) monitoring the operating status of the memory and acquiring the error information of the memory: the system may obtain the error information that occurs in the memory in real time by monitoring the operating status of the memory. The error information may include the number of memory checksum errors (CE), the location of CE, etc. (2) Determining the frequency of the correctable errors based on the error information: based on the obtained error information, the system counts the number of times of the correctable errors that occur in the memory and calculates the frequency of the errors. The frequency here represents the number of times the errors occurring during a certain period of time. (3) Determining whether there is the frequency spike point based on frequency: the system determines whether there is the frequency spike point based on the frequency of the errors. The frequency spike point refers to the change rate of the frequency of the errors that exceeds the set change rate threshold. If the frequency of the errors significantly increases in a short period of time, that is, exceeding the preset threshold, it may be determined that there is the frequency spike point. (4) Determining whether to issue the fault warning based on the frequency spike point: if there is the frequency spike point, the system determines that the memory is at risk of the faults and triggers the fault warning mechanism. The system may send alert notifications to the administrators or other relevant personnel in order to take timely measures to repair the faults or perform other necessary operations.

Through the above steps, the method for detecting the memory fault may determine the target detection parameters based on the error information, including the frequency of the correctable errors. Then, based on the target detection parameters, the system may determine the fault detection results of the memory and decide whether to issue the fault warning based on the fault detection results. For example, if the error frequency suddenly increases and exceeds the preset threshold, the system determines that the memory is at risk of the fault and issues the fault warning in a timely manner to ensure the stability and reliability of the system.

In an embodiment, determining the frequency of the correctable error that occurs based on the error information includes:

acquiring numbers of times of the correctable error that occurs in the memory during a plurality of consecutive first time periods;

wherein determining whether there is the frequency spike point based on the frequency includes:

determining whether a difference value between a number of times of the correctable error that occurs in the memory during a current first time period and a number of times of the correctable error that occurs in the memory during a previous first time period is greater than a number-of-times threshold; and when the difference value between the number of times of the correctable error that occurs in the memory during the current first time period and the number of times of the correctable error that occurs in the memory during the previous first time period is greater than the number-of-times threshold, determining there is the frequency spike point.

This embodiment describes the method for determining the frequency of the correctable error that occurs in the memory based on the error information. The method includes the following steps: in monitoring the operating status of the memory, the number of times of the correctable error that occurs in the memory may be recorded and grouped by time periods. This step refers to obtaining the number of times of memory errors during multiple consecutive time periods. Then it compares the number of times of the correctable error that occurs in the memory during the current first time period and the number of times of the correctable error that occurs in the memory during the previous first time period. If the difference value between the two is greater than the preset number-of-times threshold, that is, if the difference value is greater than the number-of-times threshold, it is determined that there is the frequency spike point. Based on the determination results, it may be concluded that the frequency of the correctable errors that occur in the memory has suddenly increased within the current first time period, indicating a risk of faults.

Through the above steps, the frequency of the correctable errors that occur in the memory may be determined based on the error information, and whether there is the frequency spike point may be determined to determine whether the memory is at risk of the faults. Based on the fault detection results, corresponding fault warning measures may be taken. This method may improve the accuracy and efficiency of memory fault detection, helping to detect and solve memory problems in a timely manner.

As shown in FIG. 5, $t_1$ is the first one of second time periods, $t_2$ is the second one of the second time periods, $t_3$ is the third one of the second time periods, $t_k$ is the k-th one of the second time periods, $t_{k+1}$ is the (k+1)-th one of the second time periods, where $t_{k+1}$ has the frequency spike point.

In an embodiment, determining the frequency of the correctable error that occurs based on the error information includes:

acquiring a plurality of consecutive second time periods during which numbers of times of the correctable error reach a preset trigger number of times;

wherein determining whether there is the frequency spike point based on the frequency includes:

determining whether a difference value between a current second time period and a previous second time period is greater than a time threshold;

when the difference value between the current second time period and the previous second time period is greater than the time threshold, determining there is a mutation point in the current second time period.

This embodiment describes another implementation of determining the frequency of the correctable errors that occur in the memory based on the error information. Firstly, in the embodiment, it is necessary to obtain the plurality of consecutive second time periods during which the numbers of times of the correctable error reach the preset trigger number of times. This second time period may be a fixed time period, such as one minute or one hour, or a dynamically adjusted time period that may be flexibly set according to the actual situation. Then, based on the number of times of the correctable errors that occurred during the second time period, whether there is the frequency spike point is determined. The frequency spike point refers to a point in the second time period where the frequency of the correctable errors suddenly increases significantly. To determine whether there is the frequency spike point, the difference value between the current second time period and the previous second time period may be compared. If the difference value is greater than the time threshold, it may be determined that there is the mutation point in the current second time period. If there is the frequency spike point, it may be determined that there is a risk of memory faults and the fault warning may be issued. The fault warning may take a series of measures, such as sending alert notifications to relevant personnel, recording fault information for subsequent analysis and processing, etc.

In summary, this embodiment further refines the steps and determination methods for determining the frequency of the correctable errors based on the error information, provides a specific operational process for implementing the memory fault detection, and may timely warn of potential fault risks, helping to improve the efficiency of discovering and handling the memory faults.

In an embodiment, determining whether there is the frequency spike point based on the frequency includes:

calculating a significance level based on a preset formula, wherein the preset formula is:

$$\begin{cases} U_{k,n} = U_{k-1,n} + \sum_{j=1}^{n} \operatorname{sgn}(t_k - t_j) \; k = 2, \ldots, n \\ \operatorname{sgn}(t_k - t_j) = \begin{cases} 1 & (t_j - t_k) > 0 \\ 0 & (t_j - t_k) = 0 \\ -1 & (t_j - t_k) < 0 \end{cases} \\ P_k = 2\exp\left(\dfrac{-6\left(\max_{1 \le k \le n} |U_{k,n}|\right)^2}{n^3 + n^2}\right) \end{cases}$$

where $t_k$ is a second time period corresponding to the frequency mutation point, $t_j$ is a j-th second time period, $n$ is a number of all acquired second time periods, sgn(•) is a signum function, $U_{k,n}$ is a statistic corresponding to a k-th second time period, $U_{k-1,n}$ is a statistic corresponding to a (k–1)-th second time period, $P_k$ is the significance level, and exp (•) is an exponential function; and when the significance level is not greater than a confidence level, determining there is the frequency mutation point; when the significance level is greater than the confidence level, determining there is no frequency mutation point.

This embodiment uses a non-parametric testing method (the formula of the method is shown above), such as Pettitt mutation test, to test whether there is the mutation point during the time period it takes for the number of memory CEs to reach the preset trigger number of times each time, and to determine whether the mutation is significant. The hypothesis H0 of Pettitt mutation test is that there is no mutation in the time it takes for the number of the memory CEs to reach the preset trigger number of times; and the hypothesis H1 is that: there is the mutation in the time it takes for the number of the memory CEs to reach the first threshold for the k-th time.

To solve the above technical problems, the present application further provides a system for detecting a memory fault, as shown in FIG. 6, including:

a monitoring unit 61, configured for monitoring operating status of memory, and acquiring error information of the memory;

a number-of-times determination unit 62, configured for determining a number of times of a correctable error that occurs in the memory based on the error information;

a parameter determination unit 63 configured for, when the number of times of the correctable error reaches a preset trigger number of times, determining a target detection parameter based on the error information; and a fault warning unit 64, configured for determining a fault detection result of the memory based on the target detection parameter, and determining whether to issue a fault warning based on the fault detection result.

In an embodiment, the monitoring unit 61 is configured for monitoring the operating status of the memory, and determining an error type when an error occurs in the memory, wherein the error type includes a hard error and a soft error.

In an embodiment, when the error occurs in the memory, the system further includes:

an address acquisition unit, configured for determining a memory unit where the error occurs, and acquiring address information of the memory unit where the error occurs.

In an embodiment, the parameter determination unit 63 is configured for determining a hard fault unit based on a number of times of the hard error that occurs and the address information of the memory unit when the number of times of the correctable error reaches the preset trigger number of times; and the fault warning unit 64 is configured for determining the fault detection result of the memory based on a number of hard fault units, and determining whether to issue the fault warning based on the fault detection result.

In an embodiment, the parameter determination unit 63 is configured for determining a soft fault unit based on a number of times of the soft error that occurs and the address information of the memory unit when the number of times of the correctable error reaches the preset trigger number of times; and the fault warning unit 64 is configured for determining the fault detection result of the memory based on a number of soft fault units, and determining whether to issue the fault warning based on the fault detection result.

In an embodiment, the fault warning unit 64 is configured for determining the fault detection result of the memory comprehensively based on the number of the hard fault units and the number of the soft fault units, and determining whether to issue the fault warning based on the fault detection result.

In an embodiment, the fault warning unit 64 is configured for calculating a first ratio of the number of the hard fault units to a number of total fault units, wherein the number of the total fault units is a sum of the number of the hard fault units and the number of the soft fault units; determining whether the first ratio reaches a first threshold; in response to the first ratio reaching the first threshold, determining that the memory is at risk of a fault, and issuing the fault warning.

In an embodiment, a plurality of memory units are arranged in an array structure; and the parameter determination unit 63 is configured for determining a number of memory units with errors in each row based on address information of memory units where the errors occur when the number of times of the correctable error reaches the preset trigger number of times; and determining a row where the number of the memory units with the errors exceeds a first preset number as a fault row; and the fault warning unit 64 is configured for determining the fault detection result of the memory based on a number of fault rows, and determining whether to issue the fault warning based on the fault detection result.

In an embodiment, the fault warning unit 64 is configured for determining whether the number of the fault rows reaches a second threshold; in response to the number of the fault rows reaching the second threshold, determining that the memory is at risk of a fault, and issuing the fault warning.

In an embodiment, a plurality of memory units are arranged in an array structure; and the parameter determination unit 63 is configured for determining a number of memory units with errors in each column based on address information of memory units where the errors occur when the number of times of the correctable error reaches the preset trigger number of times; and determining a column where the number of the memory units with the errors exceeds a second preset number as a fault column; and the fault warning unit 64 is configured for determining the fault detection result of the memory based on a number of fault columns, and determining whether to issue the fault warning based on the fault detection result.

In an embodiment, the fault warning unit 64 is configured for determining whether the number of the fault columns reaches a third threshold; in response to the number of the fault columns reaching the third threshold, determining that the memory is at risk of a fault, and issuing the fault warning.

In an embodiment, an array structure of memory units is divided into a plurality of areas; and the parameter determination unit 63 is configured for determining a number of memory units with errors in each area based on address information of memory units where the errors occur when the number of times of the correctable error reaches the preset trigger number of times; and determining an area where the number of the memory units with the errors exceeds a third preset number as a fault area; and the fault warning unit 64 is configured for determining the fault detection result of the memory based on a number of fault areas, and determining whether to issue the fault warning based on the fault detection result.

In an embodiment, the fault warning unit 64 is configured for determining whether the number of the fault areas reaches a fourth threshold; in response to the number of the fault areas reaching the fourth threshold, determining that the memory is at risk of a fault, and issuing the fault warning.

In an embodiment, after determining to issue the fault warning, the system further includes:

a log unit, configured for generating a fault log and controlling the memory to restart, power down, or switch to spare memory.

In an embodiment, the parameter determination unit 63 includes:

a frequency determination unit, configured for determining a frequency of a correctable error that occurs based on the error information;

the fault warning unit 64 is configured for determining whether there is a frequency spike point based on the frequency, wherein a frequency change rate of the frequency spike point is greater than a change rate threshold; and when there is the frequency spike point, determining that the memory is at risk of a fault, and issuing the fault warning.

In an embodiment, the frequency determination unit is configured for acquiring numbers of times of the correctable error that occurs in the memory during a plurality of consecutive first time periods; and the fault warning unit 64 is configured for determining whether a difference value between a number of times of the correctable error that occurs in the memory during a current first time period and a number of times of the correctable error that occurs in the memory during a previous first time period is greater than a number-of-times threshold; and when the difference value between the number of times of the correctable error that occurs in the memory during the current first time period and the number of times of the correctable error that occurs in the memory during the previous first time period is greater than the number-of-times threshold, determining there is the frequency spike point in the current first time period, and issuing the fault warning.

In an embodiment, the frequency determination unit is configured for acquiring a plurality of consecutive second time periods during which numbers of times of the correctable error reach a preset trigger number of times; and the fault warning unit 64 is configured for determining whether a difference value between a current second time period and a previous second time period is greater than a time threshold; when the difference value between the current second time period and the previous second time period is greater than the time threshold, determining there is a mutation point in the current second time period.

In an embodiment, determining whether there is the frequency spike point based on the frequency includes:

calculating a significance level based on a preset formula, wherein the preset formula is:

$$
\begin{cases}
U_{k,n} = U_{k-1,n} + \sum_{j=1}^{n} \mathrm{sgn}(t_k - t_j) \quad k = 2, \ldots, n \\
\mathrm{sgn}(t_k - t_j) = \begin{cases} 1 & (t_j - t_k) > 0 \\ 0 & (t_j - t_k) = 0 \\ -1 & (t_j - t_k) < 0 \end{cases} \\
P_k = 2\exp\left( \dfrac{-6\left( \max_{1 \le k \le n} |U_{k,n}| \right)^2}{n^3 + n^2} \right)
\end{cases}
$$

where $t_k$ is a second time period corresponding to the frequency mutation point, $t_j$ is a j-th second time period, n is a number of all acquired second time periods, $\mathrm{sgn}(\bullet)$ is a signum function, $U_{k,n}$ is a statistic corresponding to a k-th second time period, $U_{k-1,n}$ is a statistic corresponding to a (k−1)-th second time period, $P_k$ is the significance level, and $\exp(\bullet)$ is an exponential function; and when the significance level is not greater than a confidence level, determining there is the frequency mutation point; when the significance level is greater than the confidence level, determining there is no frequency mutation point.

For the introduction of the system for detecting the memory fault, please refer to the above embodiments, and the present application will not repeat it here.

To solve the above technical problems, the present application further provides a device for detecting a memory fault, as shown in FIG. 7, including:

a storage 71, used for storing a computer program;

a processor 72 used for, when storing the computer program, implementing steps of the method for detecting the memory fault according to any one of the above embodiments.

For the introduction of the device for detecting the memory fault, please refer to the above embodiments, and the present application will not repeat it here.

To solve the above technical problems, the present application further provides a non-transitory computer-readable storage medium 82, as shown in FIG. 8, the non-transitory computer-readable storage medium 82 stores a computer program 81, and the computer program, when executed by a processor, implements steps of the method for detecting the memory fault as described above.

For the introduction of the non-transitory computer-readable storage medium 82, please refer to the above embodiments, and the present application will not repeat it here.

To solve the above technical problems, the present application further provides a server, including the device for detecting the memory fault as described above. For the introduction of the server, please refer to the above embodiments, and the present application will not repeat it here.

It should also be noted that in this specification, relationship terms such as first and second are only used to distinguish one entity or operation from another, and do not necessarily require or imply any actual relationship or order between these entities or operations. Moreover, the terms "including/comprising", "containing", or any other variation thereof are intended to encompass non-exclusive inclusion, such that a process, method, item, or device that includes a series of elements includes not only those elements, but also other elements not explicitly listed, or elements inherent to such process, method, item, or device. Without further limitations, the element limited by the statement "including one . . . " does not exclude the existence of other identical elements in the process, method, item, or device that includes the element.

The above description of the disclosed embodiments enables persons skilled in the art to implement or use the present application. Various modifications to these embodiments will be apparent to those skilled in the art, and the general principles defined herein may be implemented in other embodiments without departing from the spirit or scope of the present application. Therefore, the present application will not be limited to the embodiments shown in this specification, but will conform to the widest scope consistent with the principles and novel features disclosed in this specification.

The invention claimed is:

1. A server, comprising a processor, a baseboard management controller (BMC) and a memory, wherein the memory comprises a plurality of storage units, the integrated management controller (IMC) is provided on the processor, and the memory is connected to the BMC, the IMC is configured to read system event logs (SEL);

the BMC is configured to perform operations comprising:
acquire the SEL through the IMC, and monitor operating status of memory based on the SEL, and acquire error information of the memory, wherein the operating status of the memory comprises error information of the plurality of storage units of the memory during a time period when the plurality of storage units are monitored, the error information of the memory acquired comprises a physical address of each of the plurality of storage units where error occurred and time when the error occurred;

the BMC is further configured to calculate a number of times of a correctable error that occurs in the memory based on the error information, wherein the correctable error is an error that can be corrected using error correction codes (ECC);

the BMC is further configured to determine a target detection parameter based on the error information in response to the number of times of the correctable error reaching a preset trigger number of times, the target detection parameter comprises an error type, a frequency of occurrence of the error, a pattern of the occurrence of the error and a failure rate, and the error type comprises a hard error and a soft error; and the BMC is further configured to determine a fault detection result of the memory based on the target detection parameter, and determine whether to issue a fault warning based on the fault detection result, wherein the BMC issues the fault warning and generates a fault log in response to the fault detection result indicating that the memory has a fault or is at risk of a fault, and the BMC is configured to perform a corresponding control operation on the memory based on the fault log, the corresponding control operation comprises restarting the memory, turning off the memory power, or switching to a spare memory;

wherein the operation of determining the target detection parameter based on the error information comprises:
the BMC determines a hard fault unit based on a number of times of a hard error that occurs and address information of each of the plurality of storage units;

and/or, the BMC determines a soft fault unit based on a number of times of a soft error that occurs and the address information of each of the plurality of storage units;

and/or, in response to the plurality of storage units being arranged in an array structure, the BMC determines the number of storage units with errors in each row based on address information of storage units where errors occur, determines a row where the number of the storage units with the errors exceeds a first preset number as a fault row; and/or, determines a number of storage units with errors in each column based on the address information of the storage units where the errors occur, determines a column where the number of the storage units with the errors exceeds a second preset number as a fault column;

and/or, in response to the array structure of the storage units is divided into a plurality of areas, the BMC determines a number of storage units with errors in each area based on the address information of the storage units where the errors occur, and determines an area where the number of the storage units with the errors exceeds a third preset number as a fault area;

and/or, the BMC determines a frequency of a correctable error that occurs based on the error information.

2. The server according to claim 1, wherein the operation of acquiring SEL through the IMC, monitoring the operating status of the memory, and acquiring the error information of the memory comprises:
monitoring, by the BMC, the operating status of the memory, and determining an error type when an error occurs in the memory.

3. The server according to claim 2, wherein when the error occurs in the memory, the BMC is further configured to:
determine a storage unit where the error occurs, and acquiring address information of the storage unit where the error occurs.

4. The server according to claim 3, wherein the operation of determining, by the BMC, the fault detection result of the memory based on the target detection parameter, and determining whether to issue the fault warning based on the fault detection result comprises:
determining, by the BMC, the fault detection result of the memory based on a number of hard fault units, and determining whether to issue the fault warning based on the fault detection result.

5. The server according to claim 4, wherein the operation of determining, by the BMC, the fault detection result of the memory based on the target detection parameter, and determining whether to issue the fault warning based on the fault detection result comprises:
determining, by the BMC, the fault detection result of the memory based on a number of soft fault units, and determining whether to issue the fault warning based on the fault detection result.

6. The server according to claim 5, wherein the operation of determining, by the BMC, the fault detection result of the memory based on the target detection parameter, and determining whether to issue the fault warning based on the fault detection result comprises:
determining, by the BMC, the fault detection result of the memory comprehensively based on the number of the hard fault units and the number of the soft fault units, and determining whether to issue the fault warning based on the fault detection result.

7. The server according to claim 6, wherein the operation of determining, by the BMC, the fault detection result of the memory comprehensively based on the number of the hard fault units and the number of the soft fault units, and determining whether to issue the fault warning based on the fault detection result comprises:

calculating, by the BMC, a first ratio of the number of the hard fault units to a number of total fault units, wherein the number of the total fault units is a sum of the number of the hard fault units and the number of the soft fault units;

determining, by the BMC, whether the first ratio reaches a first threshold;

in response to the first ratio reaching the first threshold, determining, by the BMC, that the memory is at risk of a fault, and issuing the fault warning.

8. The server according to claim 3, wherein the operation of determining, by the BMC, the fault detection result of the memory based on the target detection parameter, and determining whether to issue the fault warning based on the fault detection result comprises:

determining, by the BMC, the fault detection result of the memory based on a number of fault rows, and determining whether to issue the fault warning based on the fault detection result.

9. The server according to claim 8, wherein the operation of determining, by the BMC, the fault detection result of the memory based on the number of the fault rows, and determining whether to issue the fault warning based on the fault detection result comprises:

determining, by the BMC, whether the number of the fault rows reaches a second threshold;

in response to the number of the fault rows reaching the second threshold, determining, by the BMC, that the memory is at risk of a fault, and issuing the fault warning.

10. The server according to claim 3, wherein the operation of determining, by the BMC, the fault detection result of the memory based on the target detection parameter, and determining whether to issue the fault warning based on the fault detection result comprises:

determining, by the BMC, the fault detection result of the memory based on a number of fault columns, and determining whether to issue the fault warning based on the fault detection result.

11. The server according to claim 10, wherein the operation of determining, by the BMC, the fault detection result of the memory based on the number of the fault columns, and determining whether to issue the fault warning based on the fault detection result comprises:

determining, by the BMC, whether the number of the fault columns reaches a third threshold;

in response to the number of the fault columns reaching the third threshold, determining, by the BMC, that the memory is at risk of a fault, and issuing the fault warning.

12. The server according to claim 3, wherein the operation of determining, by the BMC, the fault detection result of the memory based on the target detection parameter, and determining whether to issue the fault warning based on the fault detection result comprises:

determining, by the BMC, the fault detection result of the memory based on a number of fault areas, and determining whether to issue the fault warning based on the fault detection result.

13. The server according to claim 12, wherein the operation of determining, by the BMC, the fault detection result of the memory based on the number of the fault areas, and determining whether to issue the fault warning based on the fault detection result comprises:

determining, by the BMC, whether the number of the fault areas reaches a fourth threshold;

in response to the number of the fault areas reaching the fourth threshold, determining, by the BMC, that the memory is at risk of a fault, and issuing the fault warning.

14. The server according to claim 1, wherein the operation of determining, by the BMC, the fault detection result of the memory based on the target detection parameter, and determining whether to issue the fault warning based on the fault detection result comprises:

determining, by the BMC, whether there is a frequency spike point based on the frequency, wherein a frequency change rate of the frequency spike point is greater than a change rate threshold; and when there is the frequency spike point, determining, by the BMC, that the memory is at risk of a fault, and issuing the fault warning.

15. The server according to claim 14, wherein the operation of determining, by the BMC, the frequency of the correctable error that occurs based on the error information comprises:

acquiring, by the BMC, numbers of times of the correctable error that occurs in the memory during a plurality of consecutive first time periods;

wherein determining, by the BMC, whether there is the frequency spike point based on the frequency comprises:

determining, by the BMC, whether a difference value between a number of times of the correctable error that occurs in the memory during a current first time period and a number of times of the correctable error that occurs in the memory during a previous first time period is greater than a number-of-times threshold; and when the difference value between the number of times of the correctable error that occurs in the memory during the current first time period and the number of times of the correctable error that occurs in the memory during the previous first time period is greater than the number-of-times threshold, determining, by the BMC, there is the frequency spike point in the current first time period.

16. The server according to claim 14, wherein the operation of determining, by the BMC, the frequency of the correctable error that occurs based on the error information comprises:

acquiring, by the BMC, a plurality of consecutive second time periods during which numbers of times of the correctable error reach a preset trigger number of times;

wherein determining, by the BMC, whether there is the frequency spike point based on the frequency comprises:

determining, by the BMC, whether a difference value between a current second time period and a previous second time period is greater than a time threshold;

when the difference value between the current second time period and the previous second time period is greater than the time threshold, determining, by the BMC, there is a mutation point in the current second time period.

17. The server according to claim 16, wherein the operation of determining, by the BMC, whether there is the frequency spike point based on the frequency comprises:

calculating, by the BMC, a significance level based on a preset formula, wherein the preset formula is:

$$\left\{\begin{array}{l} U_{k,n} = U_{k-1,n} + \sum_{j=1}^{n} \mathrm{sgn}(t_k - t_j) \quad k = 2, \dots, n \\[2mm] \mathrm{sgn}(t_k - t_j) = \begin{cases} 1 & (t_j - t_k) > 0 \\ 0 & (t_j - t_k) = 0 \\ -1 & (t_j - t_k) < 0 \end{cases} \\[2mm] P_k = 2\exp\left( \dfrac{-6\left(\max\limits_{1 \le k \le n} |U_{k,n}|\right)^2}{n^3 + n^2} \right) \end{array}\right.$$

where $t_k$ is a second time period corresponding to the frequency mutation point, $t_j$ is a j-th second time period, n is a number of all acquired second time periods, $\mathrm{sgn}(\bullet)$ is a signum function, $U_{k,n}$ is a statistic corresponding to a k-th second time period, $U_{k-1,n}$ is a statistic corresponding to a (k−1)-th second time period, $P_k$ is the significance level, and $\exp(\bullet)$ is an exponential function; and when the significance level is not greater than a confidence level, determining, by the BMC, there is the frequency mutation point; when the significance level is greater than the confidence level, determining there is no frequency mutation point.

\* \* \* \* \*